Feb. 19, 1963 T. M. INGMAN 3,078,380

MAGNETIC AMPLIFIER CONTROLLED TRANSISTOR SWITCHING CIRCUITS

Filed Sept. 6, 1960

THOMAS M. INGMAN,
INVENTOR.

BY Spensley and Horn

ATTORNEYS.

United States Patent Office 3,078,380
Patented Feb. 19, 1963

3,078,380

MAGNETIC AMPLIFIER CONTROLLED TRANSISTOR SWITCHING CIRCUITS

Thomas M. Ingman, North Hollywood, Calif., assignor to Electrosolids Corporation, Los Angeles, Calif., a corporation of California Filed Sept. 6, 1960, Ser. No. 53,962
5 Claims. (Cl. 307—88.5)

Figure 1:
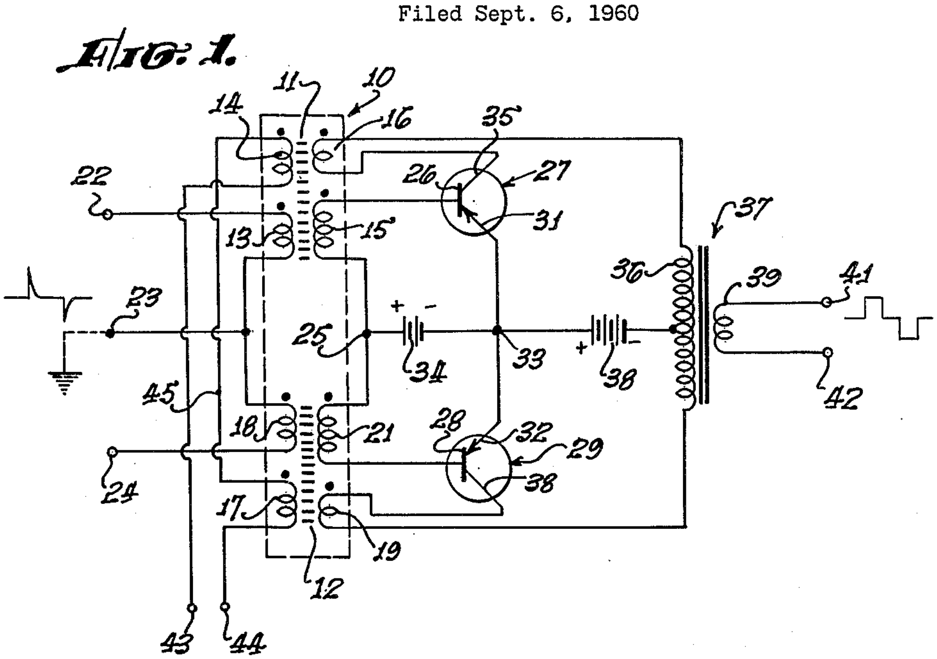

This invention pertains to electronic power regulating apparatus and more particularly to such apparatus utilizing a magnetic amplifier to control the operation of semiconductor devices in the switching mode.

Various electronic power regulating devices have been developed to provide an output voltage which remains relatively constant upon load variations. With the recent development of transistors capable of handling large amounts of power, electronic devices utilizing semiconductors as power handling components have become feasible, particularly for use in regulated output electrical power systems in which high reliability and efficiency are paramount. High efficiency is obtainable by operating the transistors in a switching mode and, if necessary reducing the resulting rectangular wave output to a desired output waveshape or to a D.C. voltage by proper filtering. Hence, switched operation of semiconductor devices can be advantageously employed in static inverter systems for converting D.C. electricity to polyphase A.C. electricity.

In switched operation the transistors are alternately switched between the high-voltage low-current cut-off condition and the high-current low-voltage saturated condition, passing very rapidly through the intermediate high-dissipation regions. Under these operating conditions, the dissipated power is quite small in comparison to the total power switched, particularly if power transistors having a very low saturation resistance are used.

A particularly suitable method for regulating the output of electronic devices utilizing switched operation of power transistors is the so-called "notch-regulation" method in which the desired regulation is accomplished by time modulation of the switched wave form. In the notch-regulation method the duration of the conduction times of the switched transistors is varied in accordance with the output power desired. This variation has occasionally been achieved by utilization of a magnetic amplifier series regulator having a control winding which senses output voltage. The signal input voltage to the transistors is a square wave, the transistors being operated in the switched mode. The transistor output current is fed through an output winding of the magnetic amplifier, where control of the core saturation characteristics provides the desired notch-regulated voltage by removing a leading portion of the wave. When no control current is applied to the magnetic amplifier, the impedance to alternating current in the load winding is very high. A small control current, however, saturates the core, thereby reducing this impedance to a very low value. Hence, the control circuitry is so arranged that under maximum load conditions the core is saturated and the entire square wave will be passed. Under lighter load conditions a D.C. control current is applied to delay core saturation, thereby clipping off the leading portion of the square wave and creating the "notch."

Hence, the output from the magnetic amplifier will be a series of rectangular pulses that vary in time duration with load but remain fixed in amplitude and period. By varying the pulse length in this manner control of the energy content of the signal pulses is achieved. Under maximum load conditions the switching pulses are of maximum length, the switching between positive and negative pulses being practically instantaneous to thereby produce a square wave output. Under lighter load conditions, less output is required so the pulse length is shortened by the creation of notches to thereby produce a series of spaced rectangular pulses. Since the pulse period remains constant with variations in load, the lighter the load the shorter the pulse length and the longer the notch.

The magnetic amplifier can be located between the power transistors and the load, but must be quite large and heavy since it must continually handle the entire output current. Hence, the magnetic amplifier is more commonly placed in an intermediate state. Regardless of the placement of the magnetic amplifier in prior art systems, the magnetic amplifier must be continually driven by the amount of drive necessary for full output, and the drive must be in the form of a square wave. Under maximum load conditions the device is quite efficient since all of the drive produced is required, but under light load conditions the device operates at reduced efficiency since only a small portion of the produced driving power is actually required.

Accordingly, it is an object of the present invention to provide improved transistor switching circuitry.

It is also an object of the present invention to provide improved electronic voltage regulating circuitry utilizing transistors in the switched mode of operation.

It is a further object of the present invention to provide transistor switching circuitry having low excitation requirements.

It is a still further object of the present invention to provide improved power amplifier systems for notch-regulated static inverters.

It is yet another object of the present invention to provide improved magnetic amplifier regulated circuitry for controlling transistors operated in the switched mode.

It is also an object of the present invention to provide improved magnetic amplifier controlled circuitry having low excitation power requirements.

It is another object of the present invention to provide improved magnetic amplifier regulated power amplifier systems for D.C. voltage regulators.

Figure 2:
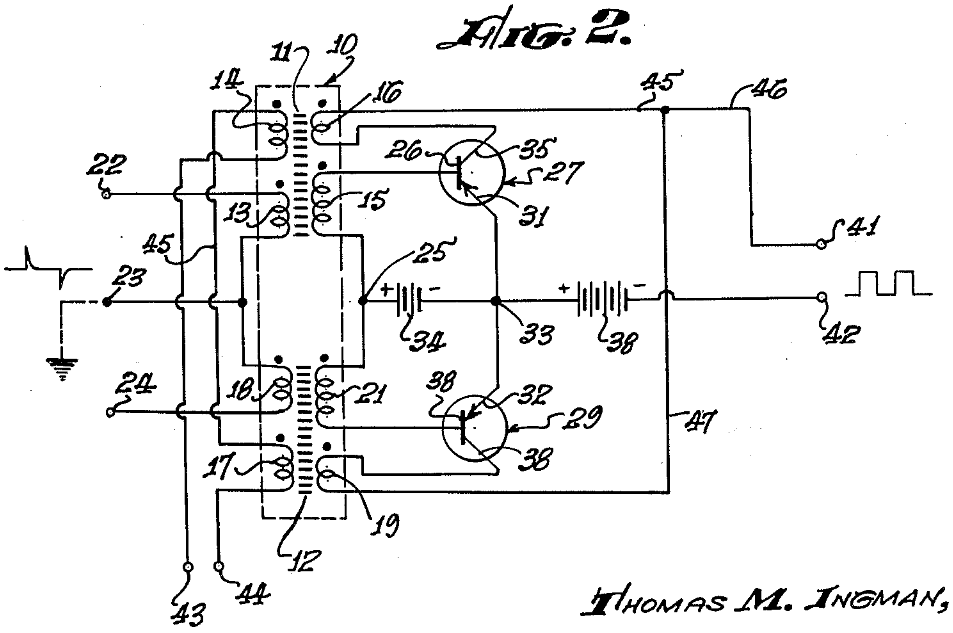

Other objects and a fuller understanding of the present invention may be had by reference to the following description and to the accompanying drawing in which like reference characters are used to refer to like parts throughout and wherein:

FIGURE 1 shows a schematic diagram of a first basic embodiment of the present invention; and FIGURE 2 shows a schematic diagram of a second basic embodiment of the present invention.

The objects of the present invention are accomplished by utilizing a combination of a magnetic amplifier with positive feedback circuitry to control the switching operation of power transistors. Unlike the aforementioned prior art magnetic amplifier series regulators which have an output winding through which the entire load current passes, the magnetic amplifier utilized in the present invention has a current feedback winding through which the output current flows. Since current feedback windings consist of only a few turns of wire, a significant decrease in magnetic amplifier weight and size is achieved. The magnetic amplifier of the present invention incorporates input and output windings which effectively provide inductive coupling of the trigger pulses used for transistor switching. Hence a magnetic amplifier is used in the present invention as a saturable core transformer rather than as a variable impedance (controlled saturable reactor). The magnetic amplifier utilized in the presently preferred embodiment has dual cores to provide two identical saturable core transformers having their corresponding input and output windings connected in series-aiding relationship to provide push-pull input and output coupling.

Referring now to FIGURE 1, there is shown a schematic diagram of a power amplifier stage in accordance with a basic embodiment of the present invention to provide a notch-regulated rectangular wave output. The amplifier stage utilizes a dual core magnetic amplifier indicated generally by the reference numeral 10. The magnetic amplifier 10 includes a first core 11 and a second core 12. Wound on the core 11 are an input winding 13, a control winding 14, an output winding 15 and a current feedback winding 16. Wound on the core 12 are an input winding 17, a control winding 18, a current feedback winding 19 and an output winding 21. Balanced input terminals 22, 23 and 24 are provided for connection to a source of input voltage trigger pulses of a desired frequency and having a steep leading edge. The input signals need supply little energy to the magnetic amplifier 10 as the signals serve merely as triggering pulses. Hence, sharply peaked voltage pulses are particularly suitable. Terminals 22 and 23 are connected to the input winding 13 on the magnetic amplifier core 11. Terminals 24 and 23 are connected to the input winding 18 of the magnetic amplifier core 12, the input windings 13 and 18 being connected in a series-aiding relationship as shown. One end of each of the output windings 15 and 21 are connected to a junction point 25. The other end of output winding 15 is connected to base electrode 26 of a power transistor 27. The other end of the output winding 21 is connected to base electrode 28 of a power transistor 29. Emitter electrodes 31 and 32 of the power transistors 27 and 29, respectively, are connected to a junction point 33. A bias battery 34, polarized as shown, is connected between the junction points 25 and 33. Collector element 35 of the power transistor 27 is connected to one end of the feedback winding 16 of the magnetic amplifier core 11, the other end of the feedback winding 16 being connected to one end of a center tapped primary winding 36 of an output transformer 37. Collector element 38 of the power transistor 29 is connected to one end of the feedback winding 19 of the magnetic amplifier core 12, the other end of the feedback winding 19 being connected to the other end of the center tapped primary winding 36 of the output transformer 37. A D.C. voltage source 38 is connected between the junction point 33 and the center tap of the primary winding 36 of the output transformer 37, the negative terminal of the voltage source 38 being connected to the center tap of the winding 36. The output transformer 37 is provided with a secondary winding 39, which is connected to a pair of output terminals 41 and 42.

The control windings 14 and 17 are connected in series-aiding relationship across control current terminals 43 and 44.

In the absence of a signal input to the magnetic amplifier 10, the power transistors are held cut off by the reverse bias provided by the bias battery 34. The power transistors 27 and 29 are connected in a push-pull circuit configuration, as shown, with the input and output windings of the magnetic amplifier 10 providing an inductively coupled input circuit. However, it is important to note that each half of the symmetrical push-pull input circuit is wound on a separate core with no significant degree of magnetic coupling between them. This decoupling of input circuit halves provides control of circuit regeneration in a manner to be hereinafter explained.

Upon application of a sufficiently large positive input trigger pulse across the input terminals 22 and 23 the pulse will be impressed across the input winding 13 and a corresponding pulse will appear across the output winding 15 to override the reverse bias on the power transistor 27 and thereby cause that transistor to begin to conduct. Upon the beginning of conduction, the power transistor 27 will be immediately driven to saturation by the flow of collector current through the associated feedback winding 16. The amount of collector current flow at saturation is dependent upon the output load, but the positive feedback effect will always drive the conducting transistor to saturation and hold it there as long as there is a positive feedback voltage generated.

A positive feedback voltage will result from the flow of transistor collector current as long as there is a changing magnetic flux in the core 11, i.e., as long as the core is not saturated. Upon core saturation, there will no longer be a flux change and hence no longer an induced feedback voltage to support the flow of transistor collector current in the absence of an input signal voltage. Hence, upon saturation of the core 11 the collector current flow in the transistor 27 will suddenly cease and the transistor will then be held cut off by the bias voltage from the bias battery 34 until another positive trigger pulse is applied to input terminals 22 and 23.

A similar cycle of operation for the power transistor 29 will occur upon the impression of a negative input trigger pulse across input terminals 24 and 23, the saturation characteristics of the magnetic amplifier core 12 now controlling the length of the output current pulse. Since the two push-pull power transistors are driven by separate magnetic amplifier cores, switching transients generated in one circuit half will not be reflected into the other circuit half. Hence, the push-pull circuit is stable, i.e., regeneration occurs only during controlled intervals.

Magnetic amplifier core saturation is the factor that determines the length of an output current pulse, assuming the trigger pulse to be relatively short. By applying a variable D.C. control voltage of the proper polarity to the control voltage terminals 43 and 44 a variable "residual" flux level can be established in the cores 11 and 12 to thereby control the amount of magnetic flux increase (volt-seconds) which will cause core saturation. To provide the desired regulation, the output load voltage is continuously sampled, rectified and compared with a preselected standard, and fed as a D.C. control voltage to the terminals 43 and 44. In practice, the control voltage circuitry is adjusted so that under conditions of maximum load the magnetic amplifier cores will saturate just as the next succeeding trigger pulse is applied to the input terminals. Under these conditions the switching between positive and negative pulses will be practically instantaneous to thereby produce the desired square wave output. Under lighter load conditions the residual flux level will be higher and the magnetic amplifier cores will be saturated before application of the next succeeding trigger pulse, to thereby produce the desired series of spaced shorter rectangular pulses. The embodiment of FIGURE 1 is particularly suitable for use in a polyphase inverter system, the resulting rectangular wave output being changed to a sine wave by proper harmonic suppression and filtering.

Referring now to FIGURE 2 there is shown a basic embodiment of the present invention for use in applications wherein it is desirable to provide a regulated D.C. output voltage or current. In this particular embodiment it can be seen that the magnetic amplifier circuitry, as well as the base and emitter circuitry of the power transistors 27 and 29 are identical with those shown in FIGURE 1. The collector circuits, however, have been changed from the previously illustrated push-pull A.C. configuration to a parallel D.C. configuration. That is, the circuit of FIGURE 2 is of the so-called push-push configuration rather than of the push-pull configuration of FIGURE 1. The collector element 35 of the power transistor 27 is connected to one end of the feedback winding 16 on the core 11, the other end of the feedback winding 16 being connected directly to the output terminal 41 through electrical leads 45 and 46. The collector electrode 38 of the power transistor 29 is connected to one end of the feedback winding 19 on the core 12, the other end of the winding being connected directly to the output terminal 41 through an electrical lead 47 and the electrical lead 46. The D.C. voltage source 38 is connected between the junction point 33 and the output terminal 42, the negative terminal of the voltage source 38 being directly connected to the terminal 42.

The output voltage appearing across the terminals 41 and 42 will be a series of notch-regulated D.C. pulses of constant magnitude and output voltage will accordingly vary the average power supplied to a load connected across the output terminals 41 and 42, without any significant variation of dissipated power. Hence, the power amplifier operates at the same high efficiency, independent of the amount of power it produces.

A practical example of the embodiment shown in FIGURE 2 is as an efficient power regulating device for electric lighting. The lighting brilliance can be determined by manual control of the D.C. control voltage applied to the control voltage terminals 43 and 44. Hence, the average power supplied to the load can be varied, not by varying the amount of power dissipated in a power rheostat, but by variation of the amount of power actually produced.

Furthermore, by insertion of a suitable filter between the output terminals and the load, the pulsating D.C. output voltage can be smoothed to a steady D.C. output. Such a filter commonly utilizes series inductance and shunt capacitance to store energy during pulse intervals and discharge it into the load during the notch intervals.

Thus, there has been described novel magnetic amplifier controlled switched transistor power amplifiers suitable for use in voltage or current regulators, or open or closed loop servo systems. The disclosed amplifiers can be driven with trigger pulses having a steep leading edge to provide a series of notch-regulated rectangular output pulses. Although the present invention has been described with a certain degree of particularity, it is understood that the present disclosure has been made only by way of example and that numerous changes in the circuitry and the combination and arrangement of parts may be resorted to without departing from the spirit and the scope of the invention as hereinafter claimed. For example, although the particular embodiments illustrated utilize a dual core magnetic amplifier in conjunction with a push-pull input circuit configuration, the principles of the present invention are equally applicable to a single-ended circuit configuration using a magnetic amplifier with only one core.

What is claimed is:

1. A transistor switching system for producing a series of notch-regulated rectangular output voltage pulses of a predetermined frequency, comprising: a saturable core transformer having an input winding, an output winding, a control winding and a current feedback winding, said input winding being adapted for coupling to a source of sharp trigger voltage pulses of said predetermined frequency, said control winding being adapted for connection to a source of control current to control the core saturation characteristics of said transformer; a regenerative amplifier including a transistor, said amplifier having signal input and signal output circuits, said signal output circuit being coupled to said transistor through said current feedback winding of said saturable core transformer to provide said regeneration, said signal input circuit being coupled to said output winding of said saturable core transformer; output terminals; output coupling means connecting said signal output circuit with said output terminals; and biasing means connected to normally bias said transistor in the reverse direction, the magnitude of the reverse bias voltage applied to said transistor by said biasing means being less than the magnitude of said trigger voltage pulses applied to said transistor through said signal input circuit and said saturable core transformer, whereby upon application of a trigger voltage pulse to said input winding to begin the forward flow of current through said transistor the transistor will be quickly driven to saturation and there held until the core of said saturable core transformer becomes saturated.

2. A transistor switching system for producing a series of notch-regulated rectangular output voltage pulses of a predetermined frequency, comprising: first and second saturable core transformers, each of said first and second saturable core transformers having an input winding, an output winding, a control winding and a current feedback winding, said input windings of said first and second transformers being connected in series aiding relationship and adapted for coupling to a source of sharp trigger voltage pulses of said predetermined frequency, said control windings of said transformers being connected in series aiding relationship and adapted for connection to a source of control current to control the core saturation characteristics of said transformers, said output windings of said transformers being connected in series aiding relationship; a regenerative amplifier including first and second transistors, said amplifier having signal input and signal output circuits, said signal output circuit being coupled to said first transistor through the current feedback winding of said first transformer and to said second transistor through the current feedback winding of said second transformer to provide said regeneration, said signal input circuit being arranged in a push-pull configuration and coupled to said output windings of said saturable core transformers with said first transistor coupled to the output winding of said first transformer and with said second transistor coupled to the output winding of said second transformer; output terminals; output coupling means connecting said signal output circuit with said output terminals; and biasing means connected to normally bias said first and second transistors in the reverse direction, the magnitude of the reverse bias voltage applied to said transistors by said signal biasing means being less than the magnitude of said trigger voltage pulses applied to said transistors through said signal input circuit and said saturable core transformers, whereby upon application of a trigger voltage pulse to the input winding of one of said saturable core transformers to begin the forward flow of current through one of said transistors that transistor will be quickly driven to saturation and there held until the core of said one of said saturable core transformers becomes saturated.

3. A transistor switching system for producing a series of notch-regulated rectangular output pulses of a predetermined frequency, comprising: first and second saturable core transformers, each of said transformers having an input winding, an output winding, a control winding and a current feedback winding, said input windings being connected in series aiding relationship and adapted for push-pull coupling to a source of sharp trigger voltage pulses of said predetermined frequency, said control windings of said transformers being adapted for connection to a source of control current to control the core saturation characteristics of said transformers, said output windings of said transformers being connected in a series aiding relationship; a regenerative amplifier including first and second transistors, said amplifier having signal input and signal output circuits, said signal input circuit being connected in a push-pull configuration to the output windings of said first and second saturable core transformers, said signal output circuit being connected to said first transistor through said current feedback winding of said first transformer and to said second transistor through said current feedback winding of said second transformer to thereby provide said regeneration; output terminals; output coupling means connecting said signal output circuit with said output terminals; and biasing means connected to normally bias said first and second transistors in the reverse direction, the magnitude of the reverse bias voltage applied to said transistors by said biasing means being less than the magnitude of said trigger voltage pulses applied to said transistors through said signal input circuit and said saturable core transformers, whereby upon application of a trigger voltage pulse to the input winding of one of said saturable core transformers to begin the forward flow of current through one of said transistors that transistor will be quickly driven to saturation and there held until the core of said one of said saturable core transformers becomes saturated.

4. A transistor switching system for producing a series of notch-regulated rectangular output pulses of a predetermined frequency, comprising: first and second saturable core transformers, each of said transformers having an input winding, an output winding, a control winding and a current feedback winding, said input windings being connected in series aiding relationship and adapted for push-pull coupling to a source of sharp trigger voltage pulses of said predetermined frequency, said control windings of said transformers being adapted for connection to a source of control current to control the core saturation characteristics of said transformers, said output windings of said transformers being connected in a series aiding relationship; a regenerative amplifier including first and second transistors, said amplifier having a signal input circuit connected in a push-pull configuration to the output windings of said transformers; an output transformer having a center-tapped primary winding and a secondary winding, one end of the primary winding of said output transformer being connected to said first transistor through said current feedback winding of said first saturable core transformer and the other end of said primary winding of said output transformer being connected to said second transistor through the current feedback winding of said second saturable core transformer to thereby provide said regeneration; output terminals; output coupling means connecting said secondary winding of said output transformer with said output terminals; and biasing means connected to normally bias said first and second transistors in the reverse direction, the magnitude of the reverse bias voltage applied to said transistors by said biasing means being less than the magnitude of said trigger voltage pulses applied to said transistors through said signal input circuit and said saturable core transformers, whereby upon application of a trigger voltage pulse to the input winding of one of said saturable core transformers to begin the flow of forward current through one of said transistors that transistor will be quickly driven to saturation and there held until the core of said one of said saturable core transformers becomes saturated.

5. A transistor switching system for producing a series of notch-regulated rectangular output pulses of a predetermined frequency, comprising: first and second saturable core transformers, each of said transformers having an input winding, an output winding, a control winding and a current feedback winding, said input windings being connected in series aiding relationship and adapted for push-pull coupling to a source of sharp trigger voltage pulses of said predetermined frequency, said control windings of said transformers being adapted for connection to a source of control current to control the core saturation characteristics of said transformers, said output windings of said transformers being connected in a series aiding relationship; a regenerative amplifier including first and second transistors, said amplifier having a signal input circuit connected in a push-pull configuration to the output windings of said transformers; first and second output terminals, said first output terminal being connected to said first transistor through said current feedback winding of said first saturable core transformer and being also connected to said second transistor through said current feedback winding of said second saturable core transformer to thereby provide said regeneration, said first and second output terminals being adapted for the connection of an electrical load thereacross; and biasing means connected to normally bias said first and second transistors in the reverse direction, said biasing means being connected to said first and second transistors and to said second output terminal and to said output windings, the magnitude of the reverse bias voltage applied to said transistors by said biasing means being less than the magnitude of said trigger voltage pulses applied to said transistors through said signal input circuit and said saurable core transformers, whereby upon application of a trigger voltage pulse to the input winding of one of said saturable core transformers to begin the flow of forward current through one of said transistors that transistor will be quickly driven to saturation and there held until the core of said one of said saturable core transformers becomes saturated.

References Cited in the file of this patent

UNITED STATES PATENTS

| | | |
|---|---|---|
| 2,977,550 | Roesel et al. | Mar. 28, 1961 |
| 2,988,653 | Samusenko | June 13, 1961 |
| 2,994,788 | Clark | Aug. 1, 1961 |